INVENTOR.
PETER V. N. HELLER

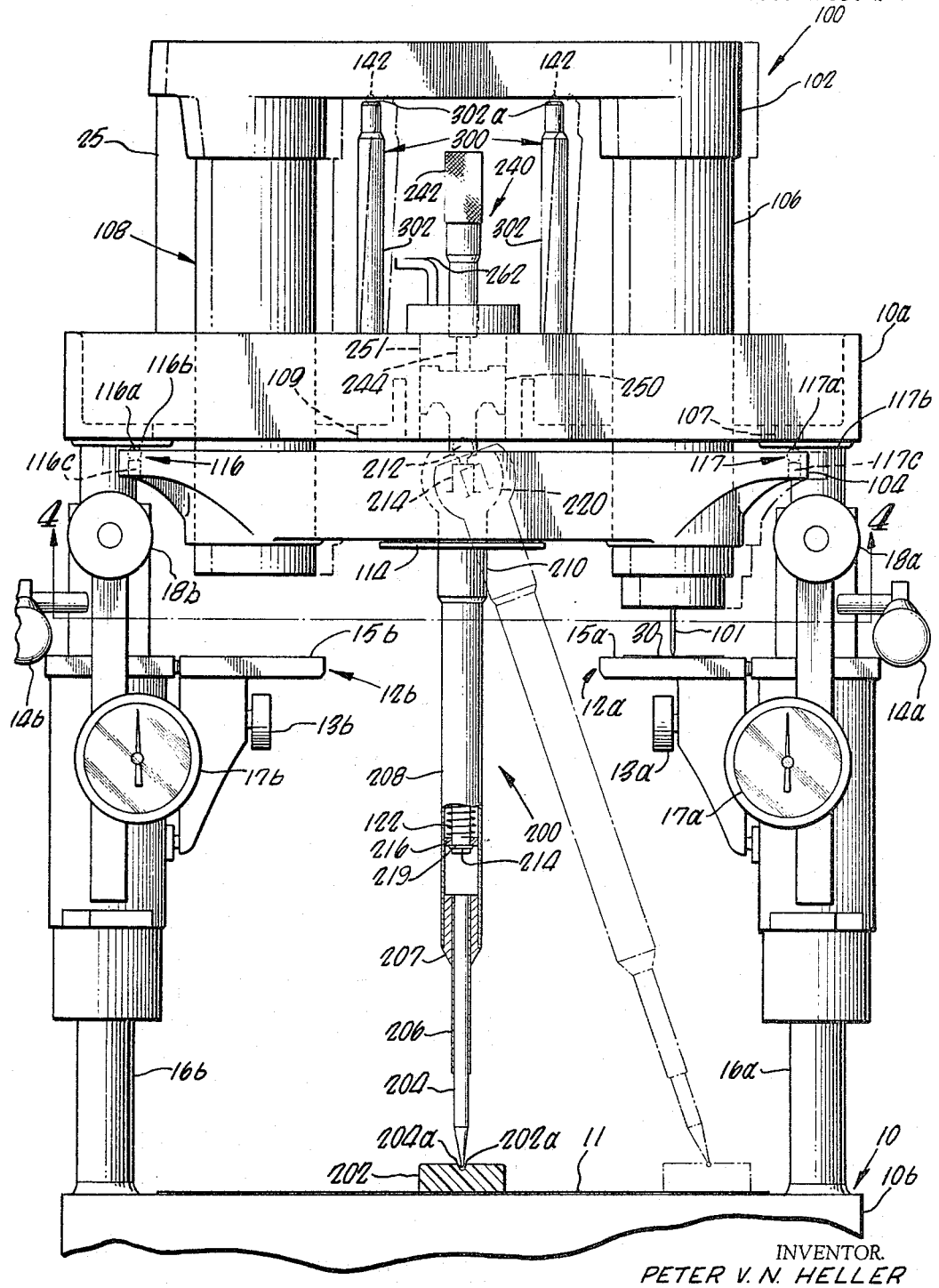

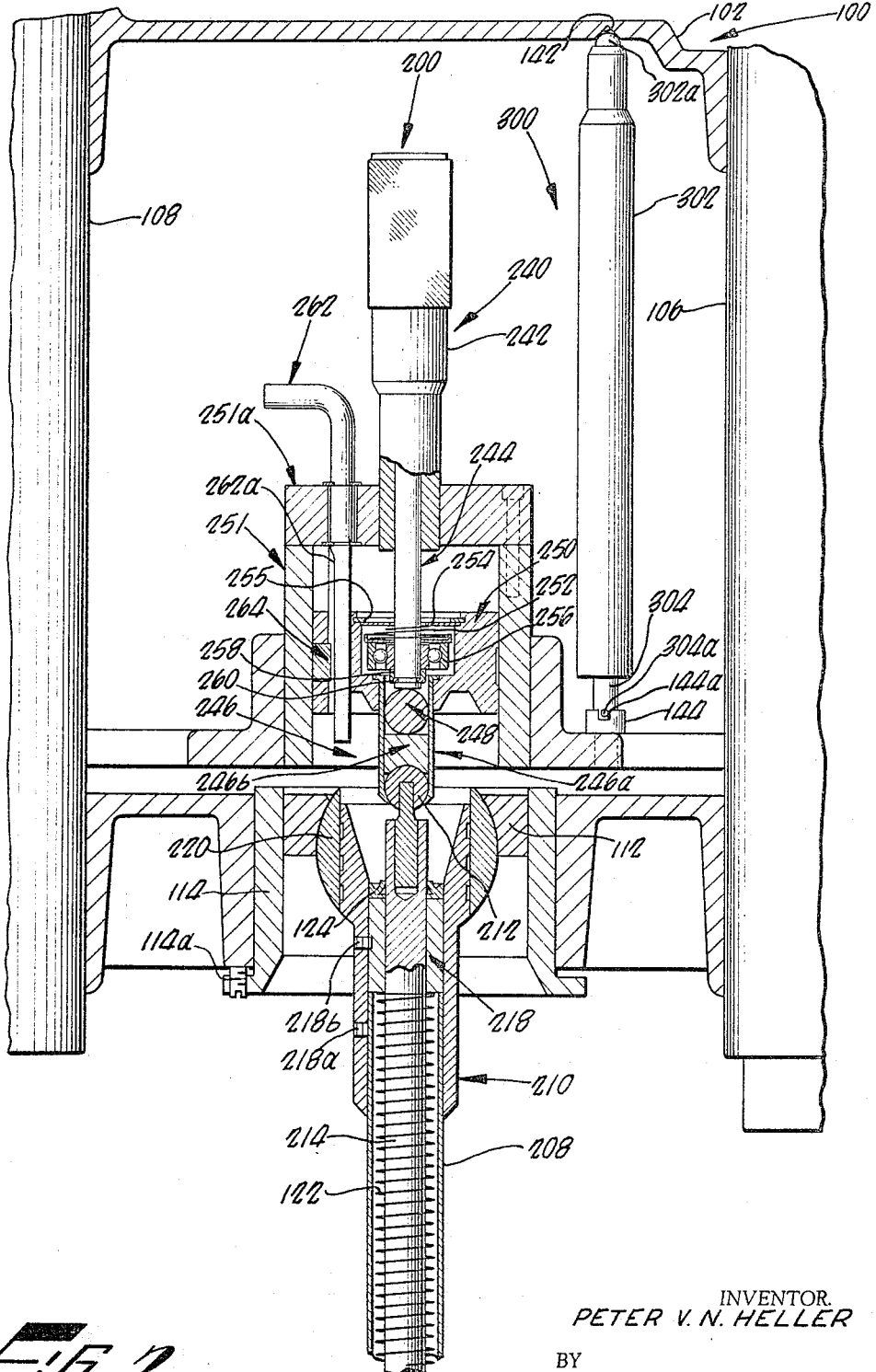

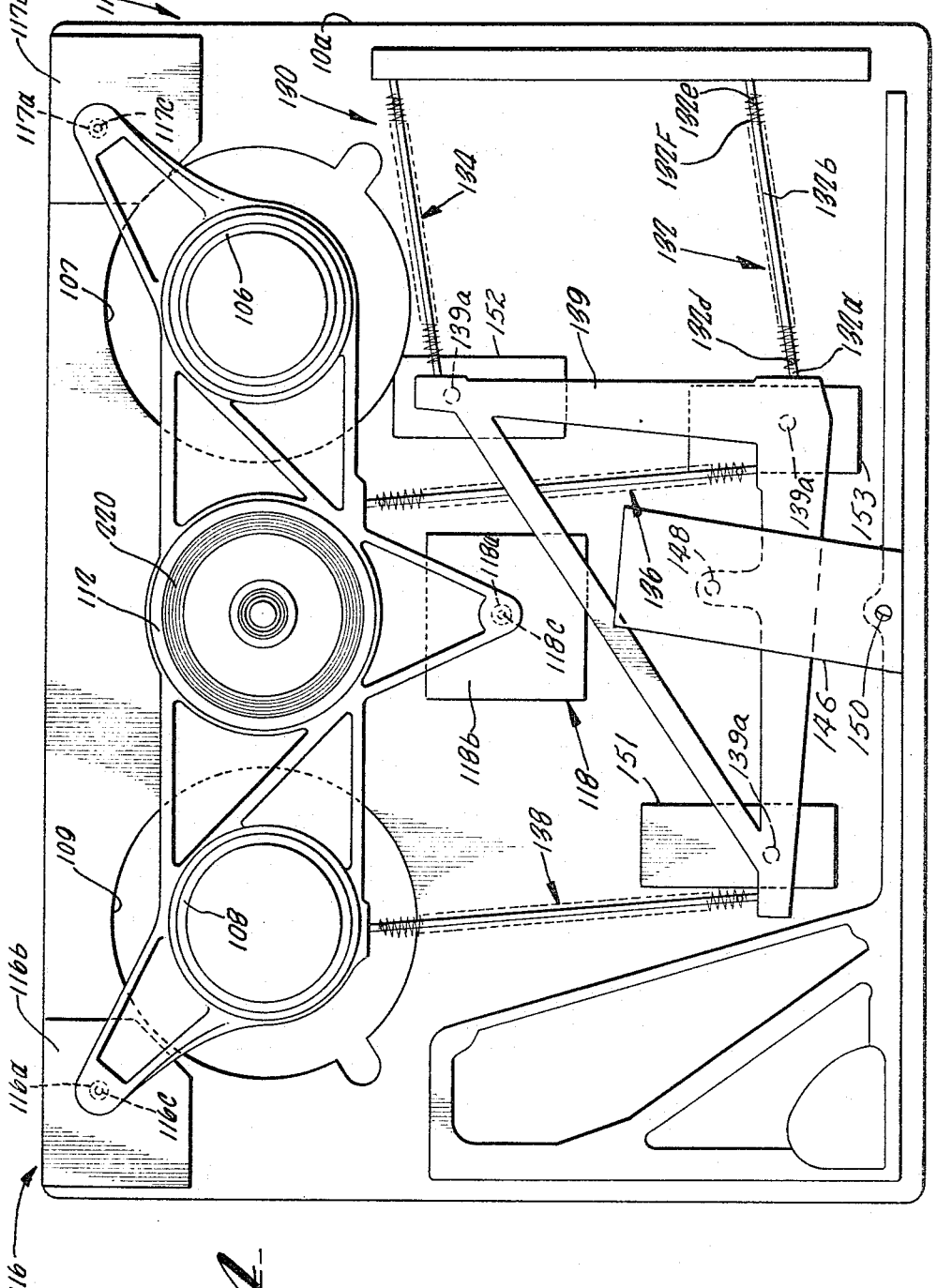

Aug. 23, 1966  P. V. N. HELLER  3,267,576
MECHANICAL REDUCTION APPARATUS
Filed June 14, 1963  5 Sheets-Sheet 5
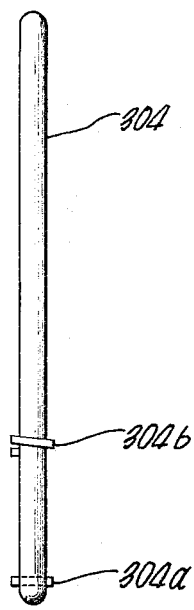
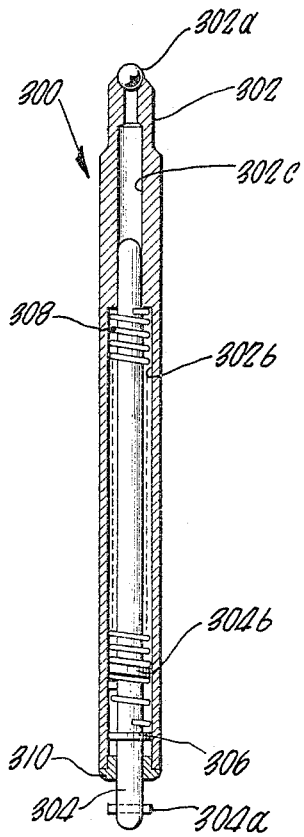
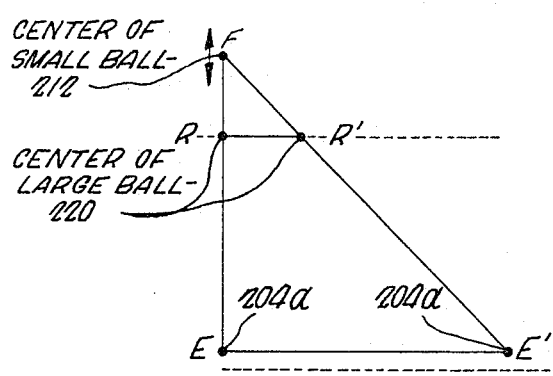
INVENTOR.
PETER V.N. HELLER
BY
Christie, Parker & Hale
ATTORNEYS.

United States Patent Office 3,267,576
Patented August 23, 1966

3,267,576
MECHANICAL REDUCTION APPARATUS
Peter V. N. Heller, 33832 Malaga Drive,
Dana Point, Calif.
Filed June 14, 1963, Ser. No. 287,930
20 Claims. (Cl. 33—24)

This invention relates to machines for manipulation of tools or parts and, more particularly, to a mechanical reduction apparatus for such machines. A subcombination of the present invention is directed to an adjustable spring loaded compression device.

Many times it is desirable to manipulate a tool or a part in a certain pattern defined by a template or a drawing. It is also necessary to manipulate the tool or the part in such a pattern on a reduced scale from the template or drawing. The manipulation of the tool must be an extremely accurate reproduction of the template or the drawing on the reduced scale.

To this end, the present invention is directed to a machine which is adapted for practically any application requiring the precise manipulation of a tool or a part. It is quite easy to actually reproduce a pattern on a reduced scale directly from a mask drawn on, for example, an 8½ inch by 11 inch drawing. Such a drawing is illuminated from underneath a table on which the drawing is placed.

It has been found that an apparatus constructed in accordance with the present invention will quite easily reproduce a mask on a reduced scale with an accuracy of plus or minus .001 inch. Additionally, hysteresis in movement of the tools or parts may be virtually eliminated by proper adjustment of the apparatus.

An extremely important feature of a mechanical reduction apparatus embodying the present invention is that the scale factor of reduction of the apparatus may be continuously adjusted over an extremely wide range of scale factors. Also, a course change in the scale factor is quite easily obtained with a simple adjustment.

Also, many of the bearings in the reduction mechanism on which accuracy of reproduction depends are spring loaded and self-adjusting to eliminate hysteresis and lost motion in the system.

An important part of the machine and a subcombination of the present invention is a compression device for applying pressure between opposite ends of the compression device. The force exerted by the compression device is easily variable continuously from a few ounces up to several pounds.

Briefly, a specific embodiment of the present invention is directed to a scaler reduction device for causing movement of an object corresponding to a pattern defined in a reference plane comprising elongated mechanical means having a first end adapted for movement in such reference plane in a desired pattern to be reduced and a second end pivotally mounted at a pivot point a prefixed distance from such reference plante, means mounted for movement with the elongated structure about the pivot point and adapted for movement along the elongation of said elongated mechanical means, means adapted for guiding the mounted means in a prefixed plane parallel with such reference plane under movement due to the movement of the elongated mechanical means about the pivot point, and means for coupling the movement of the mounted means parallel with such reference plane to the object to be moved.

Briefly, the subcombination of the compression device for use in a machine embodying the present invention comprises a first elongated mechanical means having an opening therein extending inwardly from an end thereof, a second elongated mechanical means extending into said opening, a spring positioned in said opening and having a spiral winding surrounding at least a part of said second mechanical means and arranged with an end thereof coupled to the first mechanical means, a spiral member at least partially surrounding said second mechanical means and rigidly connected thereto, said spiral member extending out from the second mechanical means in between the spiral winding of said spring whereby relative rotation between the first and second mechanical means causes the spiral member to be fed through the spiral winding of the spring for adjusting the amount of force exerted by the spring in between the first and second mechanical means.

These and other aspects of the present invention may be more fully understood with reference to the following description of the drawings, of which:

FIG. 1 is a pictorial view of a machine embodying the present invention;

FIG. 2 is a front elevation view of the machine shown in FIG. 1 shown with a portion of the base and a portion of one of the worktable control arms broken away. Also, the lower portion of the style arm, the style sleeve adapter, the style sleeve, the stylus and the chessman are shown in section. Dashed lines are used in FIG. 2 to illustrate the position of the carriage and strut and style apparatus when the chessman is displaced slightly from the center of the glass table top as shown in FIG. 2;

FIG. 3 is a section view of the machine shown in FIG. 1 taken alongthe line 3—3 shown in FIG. 1 with the work table and associated mounting posts removed and shown with upper portion of the micrometer head and a portion of the tool module holders, shown in full. The lower portion of the style arm, the style lever, the ball loading compression spring, the style lever adapter, the style sleeve, the stylus and the chessman are broken away;

FIG. 4 is a view of the machine taken along the line 4—4 of FIG. 2 showing the bottom side of the housing tray, the lower portion of the carriage mounted for movement underneath the housing tray and the parallelogram system;

FIG. 5 is a diagram illustrating the principle of operation of the carriage moving device shown in FIGS. 1 and 2;

FIG. 6 is an elevation view of the spring strut shown in FIGS. 1, 2 and 3 with a portion of the outer member broken away to show the interior structure thereof; and FIG. 7 shows a detailed view of the rod and spiral member connected thereto used in the spring strut and shown in FIG. 6.

Figure 1:
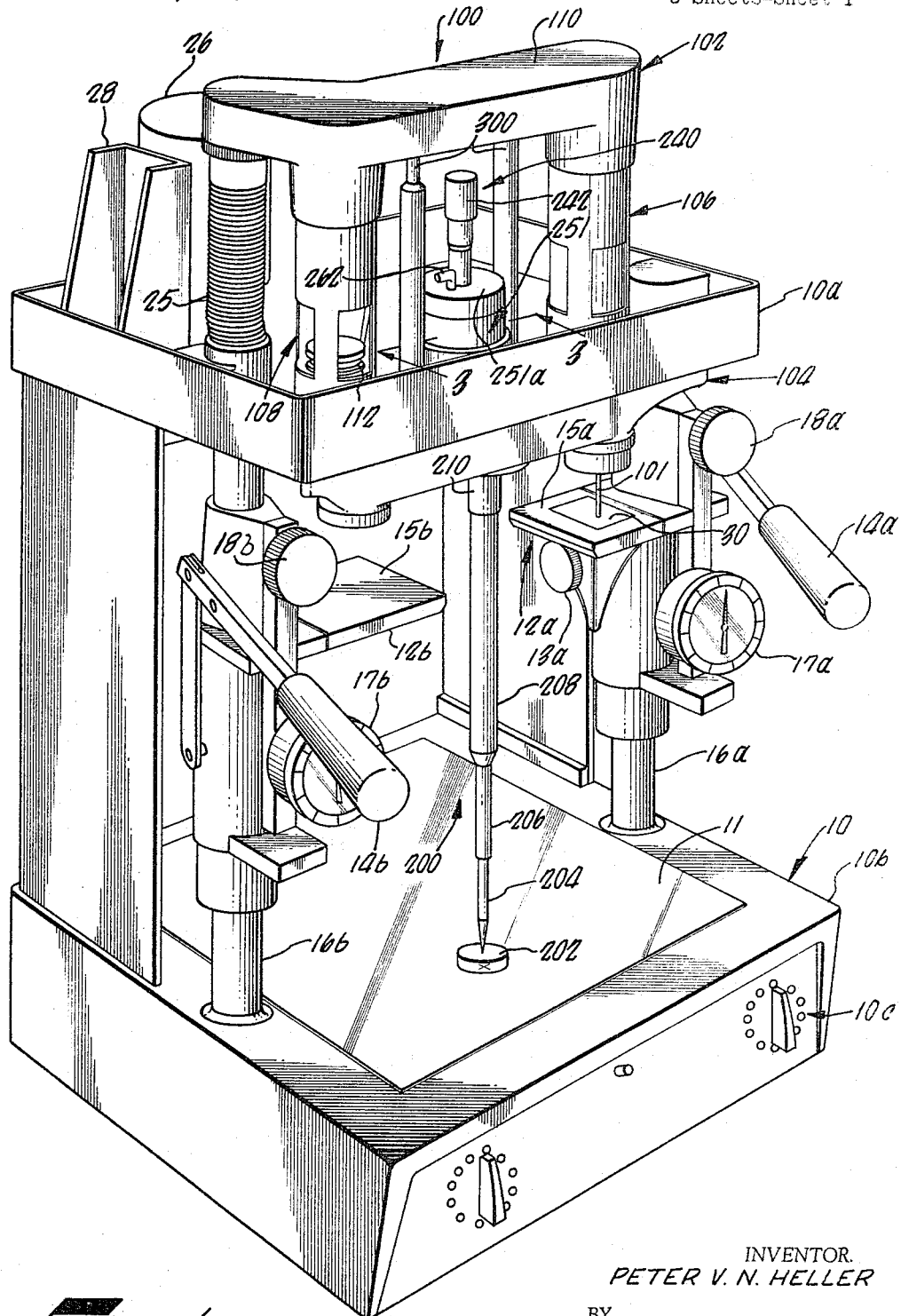

Refer now to the pictorial view of the machine embodying the present invention shown in FIG. 1. The machine includes a housing 10 for supporting various portions of the machine. The housing 10 includes an upper tray 10a and a base structure 10b. The base structure 10b has an opening therein in which a flat glass top table 11 is inserted. The glass table 11 is illuminated by a light source (not shown) from within the base structure 10b so that drawings or other templates placed on the glass table 11 are illuminated from beneath so that lines, etc., may be easily seen from above. To be explained in detail, the glass table top forms a reference surface for the machine.

A pair of work tables 12a and 12b are provided in the machine shown in FIG. 1, the work table 12a being connected at the right hand side of FIG. 1 whereas the table 12b is fastened at the left hand side thereof. The work tables 12a and 12b have flat working surfaces 15a and 15b, respectively. The flat working surfaces 15a and 15b are normally arranged parallel with the glass table top 11, so that movement parallel with the glass table top is also parallel with the working surfaces 15a and 15b. A work carriage mounting post 16a is connected between the base structure 10b and the upper tray 10a of the housing 10.

The work table 12a is securely fastened to the work carriage mounting post 16a and adapted for movement in a vertical direction parallel with the post 16a. Similar to the post 16a, a work carriage mounting post 16b is provided at the left hand side of FIG. 1 to which the work table 12b is securely fastened. The work table 12b is also movable in a vertical direction.

Work table positioning arms 14a and 14b are provided at the right and left hand sides, respectively, of the machine shown in FIG. 1 for adjusting the height of the work tables 12a and 12b, respectively. By moving the work table positioning arm 14a in an upward position, the work table 12a is moved in a downward direction. By pushing down on the work table positioning arm 14a, the work table 12a is moved in an upward direction. The operation of the work table positioning arm 14b together with the work table 12b is similar to the arm 14a and work table 12a.

Gauges 17a and 17b are associated with the work tables 12a and 12b, respectively. The gauges 17a and 17b provide a direct reading in inches as to the amount of movement of the work tables 12a and 12b, respectively. The gauges 17a and 17b have adjusting knobs (not shown) for zeroing the indication thereof when the respective work tables 12a and 12b are at a desired zero position.

Knobs 18a and 18b are provided for securing the work tables 12a and 12b at a desired working level. To this end, the work tables 12a and 12b may be positioned vertically using the arms 14a and 14b. When the level of the work tables 12a and 12b are correct, the knobs 18a and 18b may be tightened so that the tables are securely locked in such a vertical position. The work tables 12a and 12b may be removed from their respective mounting posts by loosening the bolts shown generally at 13a and 13b (see FIG. 2).

The machine shown in FIG. 1 also includes a tool carriage 100. The tool carriage 100 includes an upper carriage structure 102 and a lower carriage structure 104. The lower carriage structure 104 is rigidly connected to the upper carriage structure 102 by means of tool module holders 106 and 108. Different types of tool modules may be inserted into the tool module holders 106 and 108 for performing different machine operations on parts placed on the work tables 12a and 12b. By way of example, a scribe 101 is shown connected in the tool holder 106 for scribing marks on a flat piece of metal 30 placed on the work table 12a. The tool module holders 106 and 108 are hollow and have devices for receiving and securing the various types of tool modules for operation in the machine shown in FIG. 1. The various types of tool modules used with the machine of FIG. 1 include ultrasonic impact grinder heads, Levin precision spindle for milling, drilling and grinding, an air motor module with spindle for grinding, milling, etc., probes, light guns for photo exposure, infrared pinpoint radiant heaters, and thermo compression bonder and resistance welder. This list is by no means exhaustive but is exemplary of the different types of tool modules which can be used.

A cover 110 is placed on the top of the upper carriage structure 102. The cover 110 may be removed for easy access to the hollow interior of the tool module holders 106 and 108. A chamber (not shown) is provided in the upper carriage structure 102 having an output port connected through a flexible dust pipe 25 to the rear of the machine as shown in FIG. 1. (The port at the rear of the machine is not shown.) A vacuum may be applied to the flexible dust pipe 25 and thereby cause any dust particles formed in the tool module holders 106 and 108, during machining operations, to be sucked out and appropriately disposed of.

A drill tool module is shown placed in the tool module holder 108. Only the pulley 112 may be seen through apertures in the tool module holder 108. A motor 26 is provided and connected to a motor bracket 28 for driving various ones of the different tool modules which may be placed in the tool module holders 106 and 108. The pulley 112 may be coupled to the drive shaft (not shown) of the motor 26 by means of a flexible coupling band (not shown).

The tool carriage 100 is movable in any direction in a plane parallel with the glass top table 11. A carriage moving device 200 is provided for moving the tool carriage 100 in a desired pattern.

A chessman 202 is provided for tracing the outline of pattern placed on the glass table top 11. The chessman 202 has cross hair lines at the bottom thereof to allow easy tracing of lines on table 11. Linkage mechanisms in the carriage moving device 200 couple the movement of the chessman 202 to the tool carriage 100 causing it to move in the desired pattern defined by the chessman 202 except on a reduced scale. In this manner, tools such as the scribe 101 placed in the tool module holders 106 and 108 move about adjacent the table top 15a and 15b in the same pattern as the chessman 202. To be explained in detail in connection with FIGS. 2 and 3, the bearings for the tool carriage 100 are in between the bottom surface of the upper tray 10a and the top surface of the lower carriage structure 104. A vertical pivot point adjusting mechanism 240 is provided in the machine. The mechanism 240 is provided for making adjustments in the scale factor of reduction of the machine.

A pair of struts 300 shown in FIG. 1 help hold the tool carriage 100 up against the upper tray 10a. It should be noted that only two struts 300 are shown, one at the front and one at the rear on opposite sides of the top of the pivot point vertical adjusting mechanism 240. Two more struts 300 may be added, one at the front of the machine in front of the rear strut 300 and one at the rear of the machine behind the front strut shown in FIG. 1. The additional struts are used where heavy milling operations are to be made.

A control panel 10c is provided at the front of the machine in the base structure 10b. The control panel 10b has various control knobs and other devices necessary for controlling the operation of the machine.

Refer now to FIGS. 2 and 3. FIG. 2 shows a front elevation view of the machine shown in FIG. 1 with the motor 26 and motor bracket 28 removed. A portion of the stylus arm, the stylus lever, the ball loading spring, the stylus sleeve adapter, the stylus sleeve, the stylus and the chessman 202 are shown in section. FIG. 3 is a section view of the machine shown in FIG. 1 taken along the line 3—3 shown with a portion of the micrometer head in full and the lower portion of the style arm broken away.

The movement of the chessman 202 is coupled up to a pivot point at a small ball 212 by means of an elongated linkage device including a stylus 204, a stylus sleeve 206, a stylus sleeve adapter 207, a stylus arm 208 and a stylus lever 214. In this manner, movement of the chessman 202 causes the linkage device including the stylus 204, the stylus sleeve 206, the stylus sleeve adapter 207, the stylus arm 208 and the style lever arm 214 to pivot or rotate about a pivot point defined at the center of the small ball 212. The stylus 204 and stylus sleeve 206 actually form an extensible end for the linkage including the stylus arm 208 so that as the chessman 202 moves over the surface of the glass table top 11, the stylus 204 extends out and allows the bottom of the chessman 202 to remain in contact with the glass table top 11. The chessman 202 has a bearing 202a therein in which the end 204a of the stylus 204 is secured. The end 204a of the stylus 204 is adapted for pivot action in the bearing 202a formed in the chessman 202. It should be noted that the end 204a of the stylus 204 moves about in a plane parallel with the reference plane defined by the table top 11.

The stylus 204 is circular shaped and slips in and out of the stylus sleeve 206. The stylus sleeve 206 is tubular shaped having an inside diameter which forms a close fit around the outside of the circular stylus 204 and prevents any side movement of the stylus 204 inside of the stylus sleeve 206. A stylus sleeve adapter 207 is press fitted into the end of the style arm 204. The stylus sleeve adapter 207 has an opening therein into which the stylus sleeve 206 is also press fitted.

The style arm 208 is an elongated tubular shaped member having the style lever 214 extending into the opening thereof. The style lever 214 is elongated and circular in shape. The style arm 208 is coupled to the style lever 214 by means of a bearing which is a ring type piston 216. The piston 216 is connected on the style arm 208 and held thereon adjacent the end thereof by means of a retaining ring 219, which is securely fastened to the style lever 214. The piston 216 slides along the inside wall of the style arm 208. The style arm 208 is also coupled to the style lever 214 by means of a style lever bushing bearing 218. The style lever bushing bearing 218 is connected to the style arm 208 by means of a stylus arm adapter 210. The style lever bushing bearing 218 is arranged so that the style lever 214 slides up and down inside of the bearing 218. The style arm adapter 210 is connected to the style arm 208 by means of a set screw 218a. The style arm adapter 210 is in turn securely fastened to the exterior of the style lever bushing bearing 218 by means of a set screw 218b. The set screw 218b not only connects the elements 218 and 210 together but also serves as a take up adjustment for the style lever bearing 218. By adjusting the set screw 218b, adjustments for wear in the style lever bushing bearing 218 may be compensated for by compressing the walls of the bushing against the style lever 214.

A large ball 220 is provided for coupling the movement of the style arm 208 to the carriage 100. The large ball 220 has an opening extending therethrough into which the stylus arm adapter 210 extends. The stylus arm adapter 210 is securely press fitted into the opening formed in the large ball 200.

The large ball 220 is forced up against the convex interior of a large ball seat bearing 112 by means of a ball loading compression spring 122. The ball loading compression spring 122 is a spiral shaped spring which has its ends compressed in between the style lever bearing 218 and the style lever piston 216. Thus, the force exerted by the ball loading compression spring 122 forces the style lever bearing 218 which is mechanically coupled to the large ball 220 in an upward direction and thereby holds the large ball 220 against the large ball seat bearing 112. This eliminates the need for a large ball retaining ring. However, a retaining ring may be provided as desired for the particular application.

The large ball seat bearing 112 is securely fastened to a large ball seat sleeve 114 by means of set screws which are not shown. The large ball seat sleeve 114 is in turn rigidly connected to the lower carriage structure 104 by means of a locking device, also not shown. The large ball seat sleeve 114 has its outer edge flared around the edge of the lower carriage 104 and a set screw 114a threaded therein. The set screw 114a is for moving the large ball seat sleeve 114 and thereby provide a fine adjustment in the position of the center of the large ball 220 with respect to the glass table top 11.

A lip seal 124 is provided at the upper side of the style lever bearing 218 to prevent dust particles and other foreign material from working down in between the style lever 214 and the style lever bearing 218.

Refer now to the pivot point vertical adjust mechanism 240. The pivot point vertical adjust mechanism 240 is provided for forming a bearing for the small ball 212 and for adjusting the distance of the center of the small ball 212 from the plane of the glass table top 11. Included in the pivot point vertical adjust mechanism 240 is a micrometer head 242, having a micrometer spindle 244. The micrometer head 242 adjusts the micrometer spindle 244 through a one inch range of a displacement.

As indicated in FIG. 3, the micrometer head 242 has a conventional micrometer scale for providing an accurate indication of the position of the micrometer spindle 244. When the mechanism 244 is properly adjusted and the end of the micrometer spindle 244 is at its minimum distance from the surface of the glass table top 11, the micrometer head 242 is adjusted such that it is at the zero scale position. When the micrometer spindle 244 is at its maximum position with respect to the surface of the glass top table 11, the end of the micrometer head 242 is at a scale indication of one inch. Thus, it should now be understood that the micrometer spindle 244 is continuously adjustable through a one inch range of adjustments.

Also included in the pivot point vertical adjust mechanism 240 is a bearing for the small ball 212 referenced generally by the number 246 in FIG. 3. The bearing 246 includes a small ball seat 246a. The small ball seat 246a is a tubular shaped member formed of a material such as aluminum bronze. The small ball 212 fits inside of the small ball seat 246a which has its tubular shaped walls flared inwardly at the end adjacent the small ball 212 so as to form a bearing and to retain the small ball 212 inside thereof. Directly above the small ball 212 in the bearing 246 is a small ball loading plug 246b. The small ball loading plug 246b has a concave shape adjacent the small ball 212 to provide a bearing and upper seat for holding the small ball 212 at a fixed pivot point inside of the small ball seat 246a. The small ball loading plug 246b is formed of a porous bronze bearing material.

Downward movement of the micrometer spindle 244 is coupled to the loading plug 246b and thereby to the small ball 212 by means of a spacer ball 248. The spacer ball 248 is positioned inside of the small ball seat 246a as shown in FIG. 3.

The small ball seat 246a is connected to a scale adjust piston 250 which together with a scale adjust cylinder 251 guides the pivot point of the small ball 212 normal to the surface of the table top 11. The scale adjust piston 250 is circular and has an opening extending therethrough into which the tubular shaped small ball seat 246a extends. The upper end of the small ball seat 246a is flared out so as to tightly engage the scale adjust piston 250 and be held against movement in a vertical direction toward table top 11.

A conical compression spring 252 is provided for forcing the small ball loading plug 246b and the spacer ball 248 tightly against the end of the micrometer spindle 244. Force is applied by the spring 252 to the scale adjust piston 250 through a washer 254 and a retaining ring 255. The retaining ring 255 is rigidly connected inside of the opening of the scale adjust piston 250 and the washer 254 is positioned immediately below as shown in FIG. 3.

The conical compression spring 252 applies a force to the end of the micrometer spindle 244 acting through a ball thrust bearing 256, a spacer ring 258 and a retaining ring 260. The ball thrust bearing 256 and conical compression spring 252 are arranged such that the spring applies a force to the outer race of the ball thrust bearing 256. The spacer ring 258 is slipped around the outer surface of the micrometer spindle 244 and is forced against the inner race of the ball thrust bearing 256. The retaining ring 260 is rigidly connected adjacent the end of the micrometer spindle 244 and the spacer ring 258 is forced against the retaining ring 260 as shown in FIG. 3.

The scale adjust piston 250 has a recess machined in the outer edge thereof into which a fiber locking plug 264 is placed. Also, a circular opening is provided through the piston 250 so that it intersects the edge of the recess. Centered directly above the opening in the scale adjust piston 250 is a circular opening in the scale adjust cylinder head 251a of the scale adjust cylinder 251. A round scale adjust locking lever 262 is extended down through the circular opening in the scale adjust cylinder head 251a into the circular opening in the scale adjust piston 250. The scale adjust lock lever 262 is generally circular; however, a flattened surface is formed therein adjacent the fiber locking plug 264 which allows the fiber locking plug 264 to be positioned with only a light pressure applied to the walls of the scale adjust cylinder 251. When the scale adjust lock lever 262 is rotated so that the flattened surface 262a thereof is no longer adjacent the fiber locking plug 264, the scale adjust lock lever 262 and the fiber locking plug 264 are dimensioned such that the fiber locking plug 264 is forced tightly against the wall of the scale adjust cylinder 251. With the fiber locking plug 264 tightly engaging the wall of the scale adjust cylinder 251, the piston is tightly held in frictional engagment with the wall of scale adjust cylinder 251 so that it cannot move.

Consider now the bearing structure for the carriage 100. During the following discussion, reference should be made to FIG. 3 and FIG. 4. With reference to FIG. 4, openings 107 and 109 will be seen in the upper tray 10a through which the tool module holders 106 and 108 extend between the upper carriage structure 102 and the lower carriage structure 104. Openings 107 and 109 are also indicated in FIG. 2 by dotted or hidden lines. FIG. 4 also shows a bottom elevation view of the top tray 10a, the lower carriage structure 104 and the means for holding the carriage 100 in a fixed orientation with respect to the housing 10. The lower carriage structure 104 has a tripod type bearing system including three bearings 116, 117 and 118. The bearings 116, 117 and 118 have hard steel balls 116a, 117a and 118a, respectively. As indicated in FIG. 4, the balls 116a and 117a are connected to the lower carriage structure 104 and toward the rear of the machine. Included in the bearings 116, 117 and 118 and associated with the balls 116a, 117a and 118a are three hardened steel pads 116b, 117b and 118b. The pads 116b, 117b and 118b are flat and are oriented parallel with the plane of the glass table top 11 so that as the respective bearings move on the pad, their movement is parallel with the plane of the glass table top 11. Thus the balls 116a, 117a and 118a, together with the pads 116b, 117b and 118b, form bearings which guide the carriage 100 in a plane parallel with the glass table top 11.

Included in the bearings 116, 117 and 118 are ball adjusting set screws 116c, 117c and 118c. The set screws 116c, 117c and 118c are provided for adjusting the balls 116a, 117a and 118a with respect to the lower carriage structure 104 and thereby allow the carriage structure 104 to be adjusted parallel with the surface of the table top 11.

The means for guiding the carriage in a prefixed orientation with respect to the housing is indicated generally at 130 in FIG. 4. A pair of elongated guiding devices 132 and 134 are provided for allowing the carriage 100 to move towards the front and rear of the machine. A pair of elongated guiding devices 136 and 138 are provided for allowing the carriage 100 to move sideways in the machine. A rigid guiding member 139 is provided for interconnecting the two sets of guiding devices 132, 134 and 136, 138.

The guiding devices 132 and 134 are connected parallel to each other in between the upper tray 10a of the housing 10 and the guiding structure 139. The guiding devices 136 and 138 are connected parallel to each other in between the lower carriage structure 104 and the guiding structure 139.

The guiding devices 132, 134, 136 and 138 are all similar in construction and operation except for the lengths thereof. The guiding device 132 is shown in FIG. 4 with a spring broken away to show the interior structure thereof. Referring in particular to guiding device 132, it will be noted that it has three rods 132a, 132b and 132c connected between the upper tray 10a and the guiding structure 139. The rod 132a has one end connected to the guiding member 139. The opposite end of the rod 132a and the adjacent end of the rod 132b have a conical depression machined into the end of each and a ball bearing 132d is inserted in between the ends of the rods. Similarly, the rod 132c is connected to a projection of the upper tray 10a and adjacent ends of the rods 132c and 132b have conical depressions therein into which a ball 132e is placed.

A special shaped spring 132f has its ends connected to the rods 132c and 132a and is wound around the rods 132a, 132b and 132c. The spiral spring 132f serves two purposes. First, it applies a compression force between the rods 132a and 132c so as to hold the rods 132a, 132b and 132c tightly against the bearings 132d and 132e. Also the spring 132f has a close winding structure and is closely wound around the rods 132a, 132b and 132c such that the bearings 132d and 132e are held captive in the conical depressions of the rods 132a, 132b and 132c.

Consider now the operation of the guiding device 132. The guiding devices are shown in FIG. 4 with the carriage positioned so that the rods 132a, 132b and 132c are in a straight line. As the lower carriage structure 104 moves towards the front or back of the machine, the rod 132b rotates on the bearings 132d and 132e. The rods move out of a straight line and cause the spring 132f to deform. The guiding device 134 is identical to the guiding device 132 and is deformed in the identically same shape. Since the struts 132 and 134 are initially parallel and deform in the exact same way they hold, the orientation of the guiding member 139 with respect to the upper tray 10a remains the same regardless of the position of the lower carriage structure 104. The guiding member 139 and the guiding devices 134 and 136 in turn hold the lower carriage structure 104 in a fixed orientation and prevent rotation thereof.

The operation of the guiding devices 136 and 138 are identical to that of the guiding devices 132 and 134. However, the guiding devices 136 and 138 allow movement of the lower carriage structure 104 sideways in the machine. When the lower carriage structure 104 moves sideways in the machine, it causes the middle member 132b to pivot about the balls 132d and 132e. Similarly, the middle member of the guiding device 134, which corresponds to 132b, pivots. In this manner, the middle members of the guiding devices 132 and 134 pivot together parallel with respect to each other and thereby cause the orientation of the lower carriage structure 104 with respect to the upper tray 10a to be held fixed and the lower carriage structure 104 does not rotate.

A guide support 146 is connected by means of a bolt 150 to the underside of the upper tray 10a. The guide member 139 has a bearing 148 at its center of gravity that extends in a downward direction and slides on the upper surface of the guide support 146. The guide support 146 holds the guide member 139 up against bearing pads 151, 152 and 153, on the underside of the tray 10a, through the bearing 148. The guide member 146 has three bearings 139a which move about on the bearing pads 151, 152 and 153, thereby keeping the guide member 146 in a plane parallel with the table top 11.

Refer now in particular to the vertical strut 300. During the following discussion, reference should be made to FIGS. 3, 6 and 7. FIG. 6 shows an elevation view of the strut 300 with the outer member thereof broken away to expose the structure thereof. FIG. 7 is a diagram showing the plunger and elements connected thereto which fit inside the outer member.

The vertical strut 300 has an outer member 302 and a rod 304. The outer member 302 has a circular shaped chamber therein which is arranged into two sections having two different diameters. A portion of the chamber having the smaller diameter is shown generally at 302c whereas the portion of the chamber having the larger diameter is shown generally at 302b. The outside diameter of the rod 304 is dimensioned such that it slides with a minimum amount of play in the portion of the chamber shown generally at 302c. The rod 304 also has a piston 306 securely mounted thereto for guiding the rod in the chamber. The piston 306 is dimensioned so that it slides with a minimum amount of play along the wall of the portion of the chamber shown generally at 302b. Also included in the vertical strut 300 is a spiral spring 308. The spiral spring 308 has a spiral winding wound around the rod 304 and has one end which engages the shoulder formed by the difference in diameter between the portions of the chamber shown generally at 302b and 302c. A spiral member 304b is rigidly connected to the rod 304 and extends out from the rod in between the spiral winding of the spring 308. A pin 304a is connected through the rod 304 adjacent the end which extends out of the outer member 302.

A plug 310 is connected at the end of the portion of the chamber shown generally at 302b. The plug 310 is provided as a stop for the piston 306 so that the rod 304 and spring 308 does not come out of the chamber in the outer member 302.

Referring in particular to FIG. 3, it will be noted that a strut socket 144 is provided having a groove 144a into which the pin 304a extends. The socket 144 has an opening extending down the center thereof, which is not shown in FIG. 3 into which the end of the rod 304 extends. A socket 144 is also provided for the left-hand strut 300 shown in FIG. 2, but is not shown.

The piston 306 is formed of a hardened material which will not gall under sliding movement of the end of the spring 308. Thus, the piston 306 prevents the spring from galling against the plug 310.

The piston also retains the end of the spring 308 so that it does not apply a force against the plug 310 and thereby counteract the force applied between the shoulder of the member 302 and the rod 304. In FIG. 6, the rod 304 is shown under pressure such that the spring 308 is compressed at the right-hand side of the figure against the outer member 302.

The outer member 302 also contains a hardened ball which extends out of the end thereof opposite that out of which the rod 304 extends. Referring again in particular to FIGS. 2 and 3, it will be noted that a socket 142 is provided in the upper carriage structure 102 for each of the struts 300. The hardened ball 302a of each strut 300 fits into the respective sockets 142.

With the structure of the machine in mind, consider now the operation thereof. First, consider the theory of operation of the mechanical reduction mechanism of the machine making reference to the illustrative sketch of FIG. 5. The line F–E represents the style arm 208 when positioned at right angles to the plane of the glass table top 11. The line F–E' represents the position of the style arm 208 when the style arm is positioned at some acute angle with respect to the plane of the glass table top 11. The point F represents the center of the small ball 212. The point R represents the center of the large ball 220. The point E represents the end 204a of the stylus 204. The end 204a of the stylus 204 is the point at which the stylus 204 pivots in the chessman 202 and is at all times in a single reference plane which is parallel and at a prefixed distance from the surface of the table top 11. The distance between the end 204a of the stylus 204 and the surface of the table top 11 is determined by the chessman 202. The point R' indicates the center of the large ball 220 when the style arm 208 is displaced as shown along the line F–E'.

The principle of operation of the mechanical reduction mechanism of the machine is based upon similar triangles. For example, the length of the line F–E divided by the length of the line E–E' is equal to the length of the line F–R divided by the length of the line R–R'. Thus, the length of the line R–R' is equal to the length of the line E–E' times a scale factor which may be referred to by the symbol K. The scale factor K is equal to the length of the line F–R divided by the length of the line F–E. Thus, the movement of the center of the large ball 220 parallel with the plane of the glass table top 11 is equal to the movement of the end 204a (which is equal to the movement of the chessman 202) parallel with the plane of the glass table top 11 times the above defined scale factor K. Since the movement of the large ball 220 is parallel with the plane of the glass table top 11 is coupled directly to the lower carriage structure 104, the carriage 100 is moved the exact same distance, parallel with the surface of the glass table top 11 and the work tables 15a and 15b, as the center of the large ball 220 is moved.

Refer now in particular to FIGS. 2 and 3 and consider the actual operation of the machine as the chessman 202 is moved about in a desired pattern. First, assume that the chessman 202 is moved from a position, as shown in solid lines in FIG. 2, perpendicular to the surface of the glass table top 11 to a position forming an acute angle with respect to the surface of the table top 11 as shown by dashed lines in FIG. 2. As the chessman 202 is moved (and the end 204a of the stylus 204 is moved), the style arm 208 pivots about the pivot point at the center of the small ball 212. As the style arm 208 pivots, the end thereof raises slightly above its initial distance from the plane of the glass table top 11. Since the operator is manipulating the chessman 202 and thereby holding it flat on the plane of the glass table top 11, the stylus 204 starts moving out of the stylus sleeve 206. Thus, the linkage mechanism including the style arm 208 extends in length due to the extension of the stylus 204 and thereby allows the chessman 202 to remain flat and parallel with the plane of the glass table top 11. This in turn allows the end 204a of the stylus 204 to remain in the same plane parallel with the surface of the glass table top 11.

Also, as the style arm 208 pivots, the movement thereof is coupled to the style lever 214 by means of the style lever piston 216 causing the style lever 214 to also pivot about the pivot point at the center of the small ball 212. As the style arm 208 and the style lever 214 pivot together about the pivot point at the center of the small ball 212, the distance between the center of the large ball 220 and the center of the small ball 212 increases. To this end, the assembly including the large ball 220, the style arm adapter 210 and the style lever bearing 218 slide away from the center of the small ball 212 against the force of the compression spring 122. Also, the large ball 220 rotates in the large ball seat bearing 112. The ball loading compression spring 122 forces the large ball and maintains it in the bearing formed by the large ball seat bearing 112.

It is important to note that in the absence of the carriage 100, the large ball 220 would tend to move upward toward the small ball 212. However, the lower carriage structure 104 is connected to the large ball seat bearing 112. Also, the lower carriage structure 104 is maintained in a plane parallel with the plane of the glass table top 11 by means of the tripod bearings including bearings 116, 117 and 118.

Thus, the center of the large ball 220 is guided along a plane parallel with the plane of the glass table top 11 by the lower carriage structure 104 as the style arm 208 is pivoted. Since the large ball 220 is guided in a plane parallel with the glass table top 11, it forces the lower carriage structure 104 along therewith. In this manner, the tool module holders 108 and 106 are moved along with the lower carriage structure 104 and are displaced proportionately to the displacement of the end 204a of the stylus 204 (and the chessman 202) parallel with the plane of the glass table top 11.

As indicated in FIG. 2, when the carriage 100 is moved from the center of the machine, the sockets for the struts in the upper carriage structure 102 are displaced with respect to the corresponding sockets for the struts 300 in the upper tray 10a. This causes the struts 300 to be moved at an angle as indicated by the dashed lines in FIG. 2. It should also be noted that the distances between the sockets in the upper tray 10a and the sockets in the upper carriage 102 for the struts 300 are greater when the style arm 308 is at an acute angle with respect to the plane of the glass table top 11 than when it is perpendicular thereto. The operation of the struts 300 in this respect is quite important in that one of the functions of the struts 300 is to maintain the lower carriage 104 with the balls 116a, 117a and 118a in engagement with the pads 116b, 117b and 118b. Thus, it is necessary for the struts 300 to elongate as the carriage moves from side to side and frontwards and backwards from the center of the machine. To this end, the struts 300 are initially adjusted so that the spring 308 is compressed therein. This is accomplished by gripping the outside of the outer member 302 and rotating it thereby causing the spring 308 therein to rotate and move the spiral member 304b on the associated rod 304 out towards the end of the spring 308 adjacent the plug 310. The force exerted between the rod 304 and the outer member 302 increases as the outer member 302 is rotated causing the spring 308 to rotate and move the spiral member 304b through the spiral winding towards the end adjacent the plug 310. Conversely, force exerted between the rod 304 and outer member 302 decreases as the outer member 302 is rotated causing the spiral spring 308 to rotate and move the spiral member 304b through the spiral windings of the spring towards the opposite end of the spring 308 from the plug 310. In this manner, for a given fixed distance between the end of the rod 304 and the ball 302a, the desired force between the rod 304 and the outer member 302 may be obtained.

Referring now in particular to the use of the struts 300 in the machine as shown in FIG. 2, the struts 300 are placed in the machine under compression so that as the upper carriage 102 moves from the center of the machine, the rod 304 and outer member 302 of the struts are forced in opposite directions thereby continually applying force in between the upper tray 10a of the housing 10 and the upper carriage 102 thereby helping to maintain the correct pressure contact between the balls and pads of the bearings.

The struts 300 are used to vary the force on the pads of the bearings 116, 117 and 118 from a few ounces to several pounds. By decreasing the force on the pads, friction between the balls and pads of the bearings 116, 117 and 118 is decreased. The result is that less hysteresis in movement is encountered between the chessman 202 and the movement of the carriage; thus, very little force is needed for light and highly accurate operations. However, where heavy side loads are expected during machine operations, the force due to the struts must be increased accordingly to hold the balls on the pads in bearings 116, 117 and 118.

Consider now the operation of the pivot point vertical adjusting mechanism 240. As indicated with reference to FIG. 5, the scale factor determining the amount of movement of the carriage (i.e., the displacement along the line R-R' is determined by a scale factor K determined by the distance between the center of the small ball 212 and the end 204a of the style 204 and the distance between the center of the large ball 220 and the end 204a. The vertical adjustment of the center of the small ball 212 is made by the pivot point vertical adjusting mechanism 240. If it is desired to increase the proportional movement of the carriage for the corresponding movement of the chessman 202, the center of the small ball 212 is adjusted in an upward direction with the center of the small ball 212 further away from the center of the large ball 220. If it is desired to decrease the movement of the carriage for the corresponding movement of the chessman 202, the center of the small ball 212 is adjusted down toward the center of the large ball 220. With the arrangement as shown in FIGS. 2 and 3, the scale factor of the machine may be adjusted anywhere from a scale factor of thirteen to one to infinity to one. The scale factor of infinity to one is obtained by adjusting the center of the small ball 212 so that it coincides with the center of the large ball 220. With reference to FIG. 5 under these conditions it will be noted that the center of the small ball indicated generally at the point F coincides with the center of the large ball 220 indicated by the symbol R.

Larger changes in scale factor are easily obtainable by either adjusting the large ball bearing 112 downward or by placing an alternate large ball seat bearing 112 immediately below the one shown in FIG. 3 so that the center of the large ball 112 is adjusted further in a downward direction.

As previously described, the actual adjustment of the position of the center of the small ball 212 with reference to the end 204a of the stylus 204 is adjusted by appropriately adjusting the micrometer 242.

What is claimed is:

1. A device for manipulating the position of a tool on a reduced scale from a pattern defined in a reference plane comprising a reference surface on which desired patterns to be reduced are defined, a housing including at least three flat bearing pads spaced apart and oriented facing the reference surface to allow movement on each parallel with the reference surface, a work table for supporting objects to be worked on, a tool carriage for supporting tools with respect to said work table including at least three carriage bearings adapted for movement on the bearing pads, a first ball, an elongated inner linkage device connected to said first ball, a ball support device connected to said housing including a first bearing for pivotally mounting said first ball and the connected inner linkage with respect to the reference surface, a second ball, an elongated outer linkage device having an end connected to said second ball, said second ball and outer linkage device including an opening therein in which said inner linkage extends, a second bearing for coupling movement of the outer linkage to the inner linkage device and adapted to permit sliding relative motion between the elongated inner linkage device and the outer linkage device, a third bearing for pivotally connecting said second ball to the carriage, a compression spring in the opening of the outer linkage device and coupled between the inner linkage device and the outer linkage device for forcing such linkage devices in opposite directions such that the second ball applies a force through the third bearing to the carriage tending to force same and the connected carriage bearings against the bearing pads, and an extensible linkage device mounted at an end of said elongated outer linkage device opposite the second ball and having an end adapted for movement parallel with the reference surface to allow desired patterns to be defined by movement of such end on the reference surface and thereby cause movement of the second ball which in turn causes movement of the carriage in a pattern defined by the movement of such end of the extensible linkage device.

2. A device as defined in claim 1 including a rigid guiding member, a first pair of elongated parallel guiding devices pivotally coupled at each end and coupled between the tool carriage and the guiding member and adapted for allowing movement of the tool carriage in a first direction, and a second pair of elongated parallel guiding devices pivotally coupled at each end and coupled between the housing and said guiding member for allowing movement of the guiding member and carriage in a direction perpendicular to the first direction, said first and second pairs of guiding devices and said guiding member being adapted to inhibit rotation of the carriage and thereby force the carriage when moved to remain in a fixed orientation with respect to the housing.

3. A device as defined in claim 1 wherein said ball support device is adjustable and comprises a piston, a piston guiding device coupled to said housing and having a wall for guiding said piston in a perpendicular direction with respect to said reference surface, means for coupling said piston to said first bearing, and a scale adjusting device coupled to the piston and adapted for moving the piston and the connected first bearing in a direction perpendicular to the reference surface for thereby adjusting the distance between the center of the first ball and the reference surface for adjusting the scale factor of reduction.

4. A device as defined in claim 1 including at least one adjustable strut connected between the housing and the carriage for forcing the carriage bearings against said bearing pads and comprising an elongated member having an opening therein, a rod extending into said opening, a spring positioned in said opening and having a spiral winding surrounding said rod and arranged with an end thereof coupled to the member, a spiral member at least partially surrounding said rod and rigidly connected thereto, said spiral member extending out from the rod in between the spiral windings of said spring whereby relative rotation between the rod and the spring causes the spiral member to be fed through the spiral winding of the spring for adjusting the amount of force exerted by the spring in between the end of the rod extending out of the elongated member and the opposite end of the elongated member.

5. A device for manipulating the position of a tool on a reduced scale from a pattern defined in a reference plane comprising a reference surface on which desired patterns to be reduced are defined, a work table for supporting objects to be worked on, tool carriage means for supporting tools with respect to said work table, means for guiding said tool carriage means in a plane parallel with said reference surface, a first ball, an elongated inner linkage device connected adjacent an end thereof to said first ball, a ball support device including a first bearing for pivotally supporting said first ball and the inner linkage device at a fixed pivot point with respect to such reference surface, a second ball, an elongated outer linkage device connected adjacent an end thereof to said second ball, said second ball and outer linkage device including an opening therein in which said inner member extends, a second bearing for coupling movement of the outer linkage device to the inner linkage device and adapted to permit sliding relative motion between the inner and outer linkage devices, a third bearing connected for movement with said carriage means and for pivotally mounting said second ball, and a compression spring in the opening of the outer linkage device and coupled between the inner and outer linkage devices for forcing such in opposite directions, and an extensible linkage device mounted at an end of said outer linkage device opposite to the second ball and having an end adapted for movement parallel with the reference surface to allow desired patterns to be defined by movement of such end on the reference surface and thereby cause movement of the outer linkage and second ball which in turn causes movement of the carriage in a pattern defined by the movement of such end of the extensible linkage device.

6. A device for manipulating the position of a tool on a reduced scale from a pattern defined in a reference plane comprising a reference surface on which desired patterns to be reduced are defined; a housing including at least three flat bearing pads spaced apart and oriented facing the reference surface to allow movement on each parallel with the reference surface; a support device for supporting objects to be worked on; a tool carriage for supporting tools with respect to said support device including at least three carriage bearings adapted for movement on the bearing pads; and a carriage moving device comprising a first elongated linkage device including an end, means connected to said housing for pivotally mounting said first linkage device at the end thereof at a predetermined position with respect to the reference surface, a spherical bearing having an opening therein through which the first elongated linkage extends, bearing means for coupling rotational movement of the spherical bearing to the first linkage device and adapted to permit sliding relative motion between the first linkage device and the spherical bearing, second bearing means for pivotally coupling the spherical bearing device to the carriage, the second bearing means and carriage being adapted for supporting the pivot center of the spherical bearing device in a prefixed reference plane parallel with the reference surface, and an extensible linkage coupled to the spherical bearing device and having an end adapted for movement parallel with the reference surface, movement on the extensible linkage device causing the spherical bearing to move with respect to the first linkage device and parallel with the reference surface and thereby force the carriage to move in a reduced scale in accordance with a pattern defined by the movement of the end of the extensible linkage device on the reference surface.

7. A device for manipulating the position of a tool on a reduced scale from a pattern defined in a reference plane comprising a reference surface on which desired patterns to be reduced are defined; a housing including at least three flat bearing pads spaced apart and oriented facing the reference surface to allow movement on each parallel with the reference surface; a support device for supporting objects to be worked on; a tool carriage for supporting tools with respect to said support device including at least three bearings adapted for movement on the bearing pads; and a carriage moving device comprising first elongated linkage means having an end, means pivotally mounting the end of said first linkage means at a prefixed pivot point with respect to such reference surface, ball means, bearing means mounted on said tool carriage for pivotally mounting the ball means, the bearing means and carriage means restricting movement of the ball means in a prefixed plane parallel to such reference surface, second elongated linkage means having an opening therein into which said first linkage means extends and is allowed to move in and out, said second linkage means being connected to said ball means, said second linkage means including an extensible end for movement on such reference surface in a desired path and thereby cause the first and second linkage means to rotate and move the ball means and as a result cause said carriage means to follow a path corresponding to that of said extensible end.

8. A device for manipulating the position of a tool on a reduced scale from a pattern defined in a reference plane comprising a reference surface on which desired patterns to be reduced are defined, a mechanical work support device, a tool carriage for supporting tools with respect to the mechanical work support device, a bearing device for said tool carriage adapted for guiding said tool carriage in a prefixed reference plane parallel to said reference surface, a first elongated structure having first and second ends, means for pivotally mounting the first end of said first elongated structure at a prefixed pivot point with respect to such reference surface, a second elongated structure having first and second ends and an opening in said first end into which the second end of said first elongated structure extends and moves in and out, ball means connected to said second elongated structure adjacent the first end thereof, and bearing means for pivotally connecting the ball means to said tool carriage thereby restricting movement of the ball means in a prefixed plane parallel to such reference surface with pivotal movement of said first and second structures, movement of the second end of said second elongated structure in a desired path with respect to said reference surface causing movement of said tool carriage to a corresponding path parallel with such reference surface.

9. A device for producing movement of a tool on a reduced scale from movement made on a reference plane comprising first elongated linkage means having first and second ends, means pivotally mounting the first end of said first elongated linkage means at a prefixed pivot point with respect to such reference plane, second elongated linkage means having an opening therein into which said first linkage means extends and moves in and out and having an extensible end for movement in such reference plane, said second linkage means being adapted for engaging and rotating said first linkage means with rotational movement thereof, ball means connected to said second elongated linkage means and means including bearing means for pivotally mounting the ball means and adapted to restrict movement of the ball means in a prefixed plane parallel to such reference plane, and means for coupling movement of said ball means parallel with said reference plane to such tool.

10. A device for producing movement of a tool on a reduced scale from movement made on a reference plane comprising first elongated linkage means, bearing means connected to said second elongated linkage means adjacent an end thereof for pivotally mounting said first elongated linkage means at a prefixed point with respect to such reference plane, second elongated linkage means having two ends and an opening therein at one end into which said first linkage means extends and moves in and out, the other end of said second elongated linkage means being extensible allowing movement thereof parallel with such reference plane, ball means connected to said second elongated linkage in between said extensible end and said pivot point, and means including bearing means for rotatably mounting the ball means and adapted for causing the ball means to move with said second linkage means only in a prefixed plane parallel to such reference plane, and means for coupling movement of said ball means parallel with said reference plane to such tool movement of said extensible end causing said first and second linkage means to rotate about said prefixed point and cause said ball means to move such tool.

11. A device for producing a movement on a reduced scale from movements made on a reference plane comprising carriage means adapted for movement in a prefixed plane with respect to such reference plane, first elongated linkage means having an end, means for pivotally mounting said first linkage means at said end at a prefixed pivot point with respect to such reference plane, second linkage means having two ends and an opening in one end into which said first linkage means extends the other end of said second linkage means being extensible for allowing movement thereof parallel with such reference plane, ball means connected to said second linkage means adjacent the end with the opening therein, and bearing means for pivotally mounting the ball means and mounted on said carriage means, said bearing and carriage means being adapted for guiding the ball means in a prefixed plane parallel to such reference plane with movement of said first and second linkage means.

12. An adjustable strut comprising an elongated member having an opening therein parallel with the length thereof, a rod extending into said opening, a string positioned in said opening and having a spiral winding surrounding said rod and arranged with an end thereof engaging the member, and a spiral member at least partially surrounding said rod and rigidly connected thereto, said spiral member extending out from the rod in between the spiral windings of said spring whereby relative rotation between the rod and the spring causes the spiral member to be fed through the spiral winding of the spring for adjusting the amount of force exerted by the spring in between the end of the rod extending out of the elongated member and the opposite end of the elongated member.

13. An adjustable strut for applying a load between two members comprising an elongated member having an end engaging one of such members and having an opening therein extending in from the opposite end and parallel with the length thereof, a rod extending into said opening, having an end connected to the other one of such members so as to inhibit rotation thereof, a spring positioned in said opening and having a spiral winding surrounding at least a portion of said rod, a spiral member at least partially surrounding said rod and rigidly connected thereto, said spiral member extending out from the rod in between the spiral windings of said spring whereby relative rotation between the rod and the spring causes the spiral member to be fed through the spiral winding of the spring for adjusting the amount of force exerted by the spring in between the end of the rod extending out of the elongated member and the opposite end of the elongated member, said spring having a second end thereof coupled to the elongated member whereby rotation of the member causes the position of the spiral member to be adjusted in the spring and thereby adjust the force applied between such two members.

14. An adjustable compression device comprising a first elongated mechanical means having an opening therein extending inwardly from an end thereof, a second elongated mechanical means extending into said opening, a spring positioned in said opening and having a spiral winding surrounding at least a part of said second mechanical means and arranged with an end thereof coupled to the first mechanical means, a spiral member at least partially surrounding said second mechanical means and rigidly connected thereto, said spiral member extending out from the second mechanical means in between the spiral winding of said spring whereby relative rotation between the first and second mechanical means causes the spiral member to be fed through the spiral winding of the spring for adjusting the amount of force exerted by the spring in between the first and second mechanical means.

15. A device for manipulating a carriage in a pattern defined in a reference plane comprising, a housing, first bearing means mounted in said housing having a flat surface parallel with a reference plane, a carriage device adapted to be moved about in any direction on said bearing surface, first and second elongated members, said first member extending into an end of said second member, said members being adapted to maintain said members in a fixed parallel orientation with respect to each other and allow sliding relative movement, means for pivotally mounting said first member on said housing and means for pivotally mounting said second member on said carriage, said second member including an extensible end for movement about in such reference plane, movement of said extensible end in such reference plane causing said first and second members to pivot in their respective mounting means and cause said carriage means to follow a path corresponding to that defined by said extensible end.

16. A device as defined in claim 15 including a follower connected to said second member comprising a transparent material having a flat bottom surface for movement in such reference plane and a mark on said bottom surface for following a line and thereby allow such a line to be followed without error due to parallax between such mark and such line.

17. A device for manipulating a carriage in a pattern defined in a reference plane comprising, a housing, first bearing means mounted in said housing having a flat surface parallel with a reference plane, a carriage device adapted to be moved about in any direction on said bearing surface, a rigid guiding member, a first pair of parallel elongated guiding members coupled between said carriage and said rigid guiding member and a second pair of parallel elongated guiding members coupled between said rigid guiding member and said housing, each of said elongated guiding members being pivotally coupled at each end, said first and second pairs of elongated guiding members inhibiting rotational movement of said carriage and thereby forcing the carriage to remain in a fixed orientation with respect to such reference plane, first and second elongated members, said first member extending into said second member, said members being adapted to maintain said members in a fixed parallel orientation with respect to each other and allow sliding relative movement, means for pivotally mounting said first member on said housing, and means for pivotally mounting said second member on said carriage, said second member including an extensible end for movement about in such reference plane, movement of said extensible end in such reference plane causing said first and second members to pivot in their respective mounting means and cause said carriage means to follow a path corresponding to that defined by said extensible end.

18. A device for manipulating a carriage in a pattern defined in a reference plane comprising, a housing, first bearing means mounted in said housing having a flat surface parallel with a reference plane, a carriage device adapted to be moved about in any direction on said bearing surface, first and second elongated members, said first member having an end extending into said second member a substantial distance, a bearing coupled between said end of said first member and the inside of said second member for maintaining said members in a fixed parallel orientation with respect to each other and allow sliding relative movement therebetween, means for pivotally mounting said first member on said housing, means for pivotally mounting said second member on said carriage including a spherical member connected to said second member, said second member including an extensible end for movement about in such reference plane, movement of said extensible end in such reference plane causing said first and second members to pivot in their respective mounting means and cause said carriage means to follow a path corresponding to that defined by said extensible end.

19. A device for manipulating a carriage in a pattern defined in a reference plane comprising, a housing, first bearing means mounted in said housing having a flat surface parallel with a reference plane, a carriage device adapted to be moved about in any direction on said bearing surface, first and second elongated members, said first member extending into said second member, said members being adapted to maintain said members in a fixed parallel orientation with respect to each other and allow sliding relative movement, first means for pivotally mounting said first member on said housing, second means for pivotally mounting said second member on said carriage and including an opening therein for allowing said first and second mounting means to be moved relative to each other to a point where the two pivot points coincide, said second member including an extensible end for movement about in such reference plane, movement of said extensible end in such reference plane causing said first and second members to pivot in their respective mounting means and cause said carriage means to follow a path corresponding to that defined by said extensible end, and adjustable means for moving said first and second mounting means relative to each other to adjust the scale factor of movement between said carriage and extensible end.

20. A device for manipulating a carriage in a pattern defined in a reference plane comprising, a housing, first bearing means mounted in said housing having a flat surface parallel with a reference plane, a carriage device adapted to be moved about in any direction on said bearing surface, first and second elongated members, said first member extending into said second member, said members being adapted to maintain said members in a fixed parallel orientation with respect to each other and allow sliding relative movement, means including a ball joint for pivotally mounting said first member on said housing, means including a ball connected to said second member for pivotally mounting said second member on said carriage, said ball having an opening therein adapted to allow said ball joint to be moved until the center of rotation thereof substantially coincides with the center of rotation of said ball, said second member including an extensible end for movement about in such reference plane, movement of said extensible end in such reference plane causing said first and second members to pivot in their respective mounting means and cause said carriage means to follow a path corresponding to that defined by said extensible end, and adjustable means for moving said ball joint and said ball relative to each other for adjusting the scale factor between movement of said extensible end and said carriage.

References Cited by the Examiner
UNITED STATES PATENTS

| | | | |
|---|---|---|---|
| 1,039,713 | 10/1912 | Eaton | 33—24 |
| 2,746,152 | 5/1956 | Deakin | 33—24 |
| 3,127,679 | 4/1964 | Crook | 33—24 |

FOREIGN PATENTS

| | | |
|---|---|---|
| 284,471 | 2/1928 | Great Britain. |
| 659,205 | 10/1951 | Great Britain. |

LEONARD FORMAN, *Primary Examiner.*

ISAAC LISANN, ROBERT B. HULL, *Examiners.*

H. N. HAROIAN, *Assistant Examiner.*